US011267183B2

(12) United States Patent
Maki et al.

(10) Patent No.: US 11,267,183 B2
(45) Date of Patent: Mar. 8, 2022

(54) FOAMING AND FILL LEVEL CONTROL THROUGH STRETCH ROD

(71) Applicant: AMCOR RIGID PACKAGING USA, LLC, Ann Arbor, MI (US)

(72) Inventors: Kirk Edward Maki, Tecumseh, MI (US); G. David Lisch, Jackson, MI (US); Bradley Richard Krzyzaniak, Manitou Beach, MI (US); Jessica T. Brown, Ypsilanti, MI (US); Corey Mitchell Janes, Hillsdale, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 0 days.

(21) Appl. No.: 16/964,262

(22) PCT Filed: Jan. 24, 2018

(86) PCT No.: PCT/US2018/014939
§ 371 (c)(1),
(2) Date: Jul. 23, 2020

(87) PCT Pub. No.: WO2019/147222
PCT Pub. Date: Aug. 1, 2019

(65) Prior Publication Data
US 2021/0039300 A1    Feb. 11, 2021

(51) Int. Cl.
*B29C 49/12* (2006.01)
*B29C 49/46* (2006.01)
(Continued)

(52) U.S. Cl.
CPC .......... *B29C 49/12* (2013.01); *B29C 49/4289* (2013.01); *B29C 49/46* (2013.01);
(Continued)

(58) Field of Classification Search
CPC ...... B29C 2049/465; B29C 2049/4655; B29C 2049/4664; B29C 2049/4667;
(Continued)

(56) References Cited

U.S. PATENT DOCUMENTS

2011/0303324 A1    12/2011    Mauro et al.
2012/0093965 A1    4/2012     Lisch et al.
(Continued)

FOREIGN PATENT DOCUMENTS

| EP | 2987612 A1 | 2/2016 |
| JP | 2017196872 A | 11/2017 |
| WO | 2017090339 A1 | 6/2017 |

OTHER PUBLICATIONS

Supplementary European Search Report issued in corresponding European Patent Application No. EP18902678 dated Jul. 15, 2021 (6 pages).
(Continued)

*Primary Examiner* — Robert B Davis
(74) *Attorney, Agent, or Firm* — Harness, Dickey & Pierce, P.L.C.

(57) ABSTRACT

Methods and systems for simultaneously forming and filling a container from a preform with fluid, adjusting a fill point of the fluid, and removing air and/or foam from within the container. One of the methods includes injecting fluid from a fill source into the preform through a nozzle passage defined between the nozzle and a seal pin of the forming and filling system to simultaneously form the container from the preform and fill the container. After the container is formed and filled, the seal pin is actuated to close the nozzle passage and prevent fluid and air from exiting the container through the nozzle passage, thereby trapping fluid and air within the container under pressure. Air, fluid, and/or foam is extracted
(Continued)

out from within the container through a passageway defined within a stretch rod to adjust a fill point of the container.

17 Claims, 4 Drawing Sheets

(51) Int. Cl.
  *B29C 49/42* (2006.01)
  *B29C 49/78* (2006.01)
  *B29L 31/00* (2006.01)

(52) U.S. Cl.
  CPC ...... *B29C 49/78* (2013.01); *B29C 2049/1228* (2013.01); *B29C 2049/465* (2013.01); *B29C 2949/7889* (2013.01); *B29C 2949/78563* (2013.01); *B29C 2949/78806* (2013.01); *B29L 2031/712* (2013.01)

(58) Field of Classification Search
  CPC .... B29C 2049/1228; B29C 2049/1238; B29C 2049/1242
  See application file for complete search history.

(56) References Cited

U.S. PATENT DOCUMENTS

| 2014/0367895 | A1* | 12/2014 | Sato ........................ B29C 49/46 264/532 |
| 2017/0113396 | A1 | 4/2017 | Chauvin et al. |
| 2018/0290366 | A1* | 10/2018 | Okuyama ................. B65D 1/00 |
| 2020/0346390 | A1* | 11/2020 | Okuyama ............... B29C 49/12 |

OTHER PUBLICATIONS

International Search Report and Written Opinion of the ISA issued in PCT/US2018/014939, dated Nov. 29, 2018; ISA/KR.

* cited by examiner

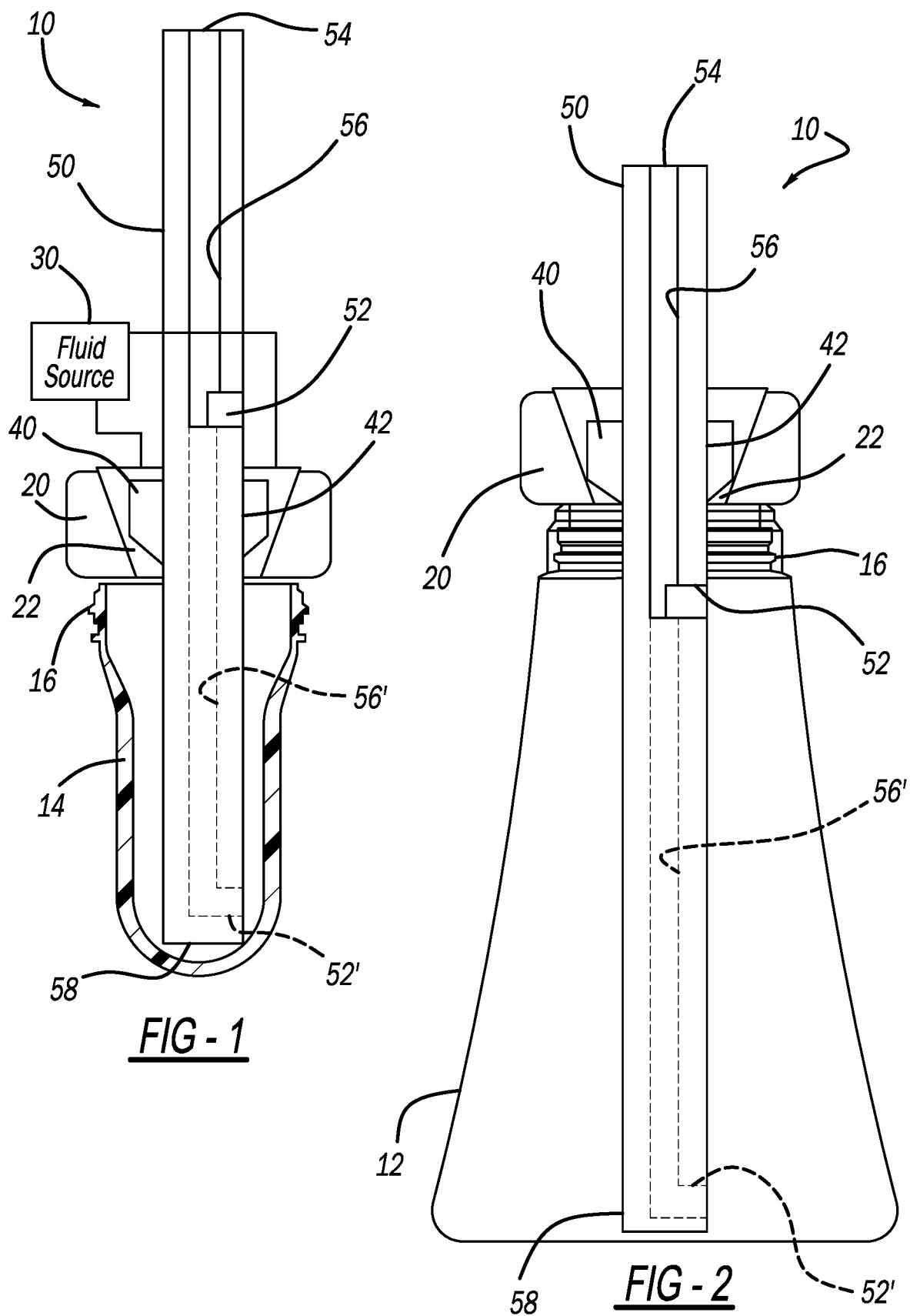

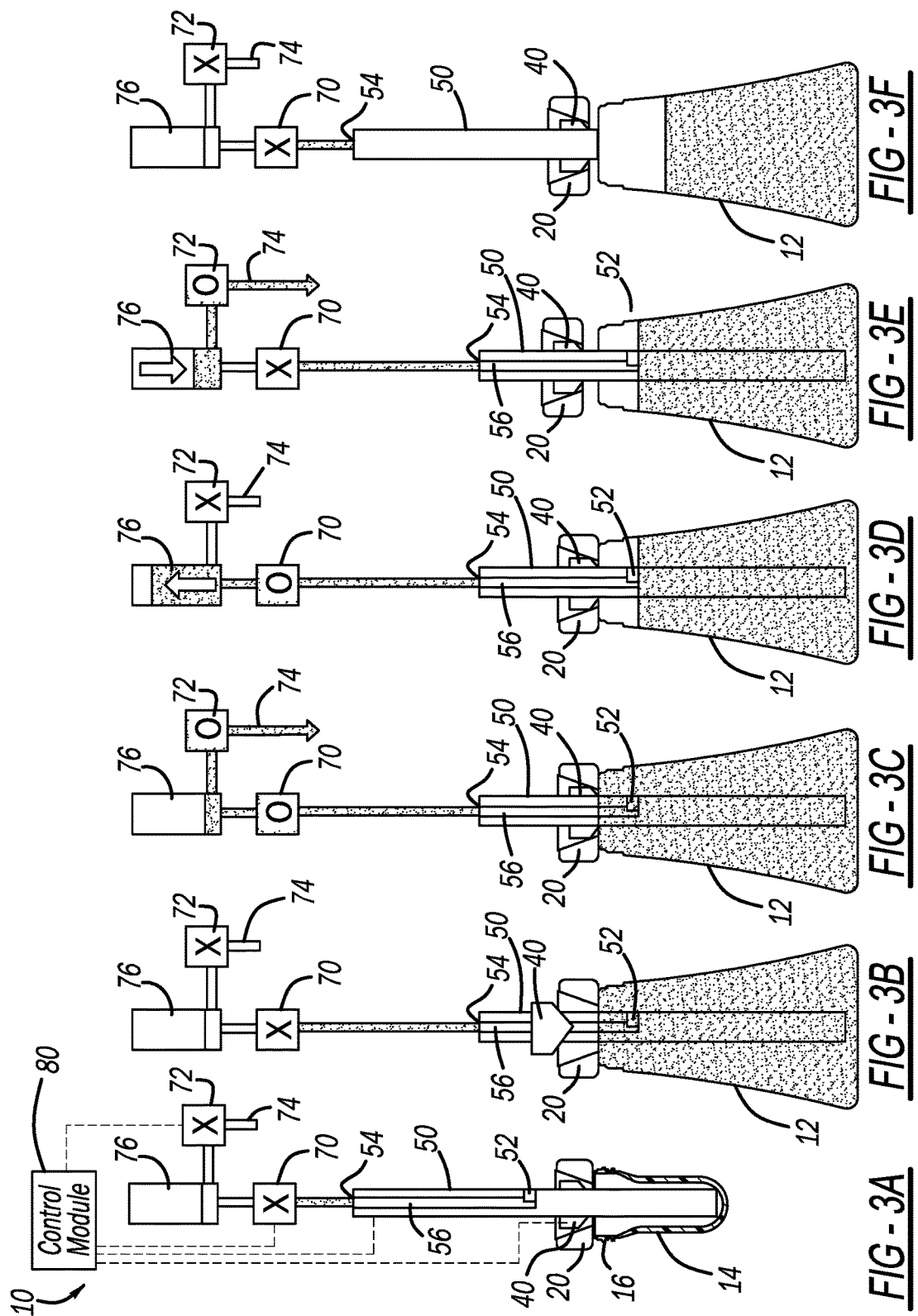

FOAMING AND FILL LEVEL CONTROL THROUGH STRETCH ROD

CROSS-REFERENCE TO RELATED APPLICATION

This application is a U.S. National Phase Application under 35 U.S.C. 371 of International Application No. PCT/US2018/014939, filed on Jan. 24, 2018, the entire disclosure of which is incorporated herein by reference.

FIELD

The present disclosure relates to methods and systems for simultaneously forming and filling a container from a preform with fluid, adjusting a fill point of the fluid, and removing foam and/or air from within the container.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Existing container forming and filling methods and systems are suitable for their intended use, but are subject to improvement. For example, there is a need for improved systems and methods for forming and filling a container with fluid, adjusting a fill point of the fluid, and removing air and/or foam from within the container. The present disclosure advantageously includes improved methods and systems for simultaneously forming and filling a container from a preform with fluid, adjusting a fill point of the fluid, and removing air and/or foam from within the container, which provides numerous advantages as explained herein and as one skilled in the art will recognize.

SUMMARY

This section provides a general summary of the disclosure, and is not a comprehensive disclosure of its full scope or all of its features.

The present disclosure includes methods and systems for simultaneously forming and filling a container from a preform with fluid, adjusting a fill point of the fluid, and removing air and/or foam from within the container. One of the methods includes injecting fluid from a fill source into the preform through a nozzle passage defined between the nozzle and a seal pin of the forming and filling system to simultaneously form the container from the preform and fill the container. After the container is formed and filled, the seal pin is actuated to close the nozzle passage and prevent fluid and air from exiting the container through the nozzle passage, thereby trapping fluid and air within the container under pressure. Air, fluid, and/or foam is extracted out from within the container through a passageway defined within a stretch rod to adjust a fill point of the container.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 illustrates components of a system for simultaneously forming and filling a container from a preform with fluid in accordance with the present disclosure, with FIG. 1 specifically illustrating the preform prior to being formed into the container;

FIG. 2 illustrates the container formed from the preform of FIG. 1;

FIG. 3A illustrates additional components of the system of the present disclosure, and the preform prior to being formed into the container;

FIG. 3B illustrates a seal pin of the system in an open position to allow fluid to flow into the preform to form and fill the container;

FIG. 3C illustrates the seal pin in a closed position and air being relieved from within the container through a passageway defined by a stretch rod seated within the container;

FIG. 3D illustrates excess fluid and foam being drawn out of the container through the passageway of the stretch rod by vacuum to provide the container with a desired fill level;

FIG. 3E illustrates separation of a nozzle from a finish of the container to define a gap therebetween, and expulsion of excess fluid out from within a cylinder of the system;

FIG. 3F illustrates the stretch rod withdrawn out from within the container;

Corresponding reference numerals indicate corresponding parts throughout the several views of the drawings.

DETAILED DESCRIPTION

Figure 4:
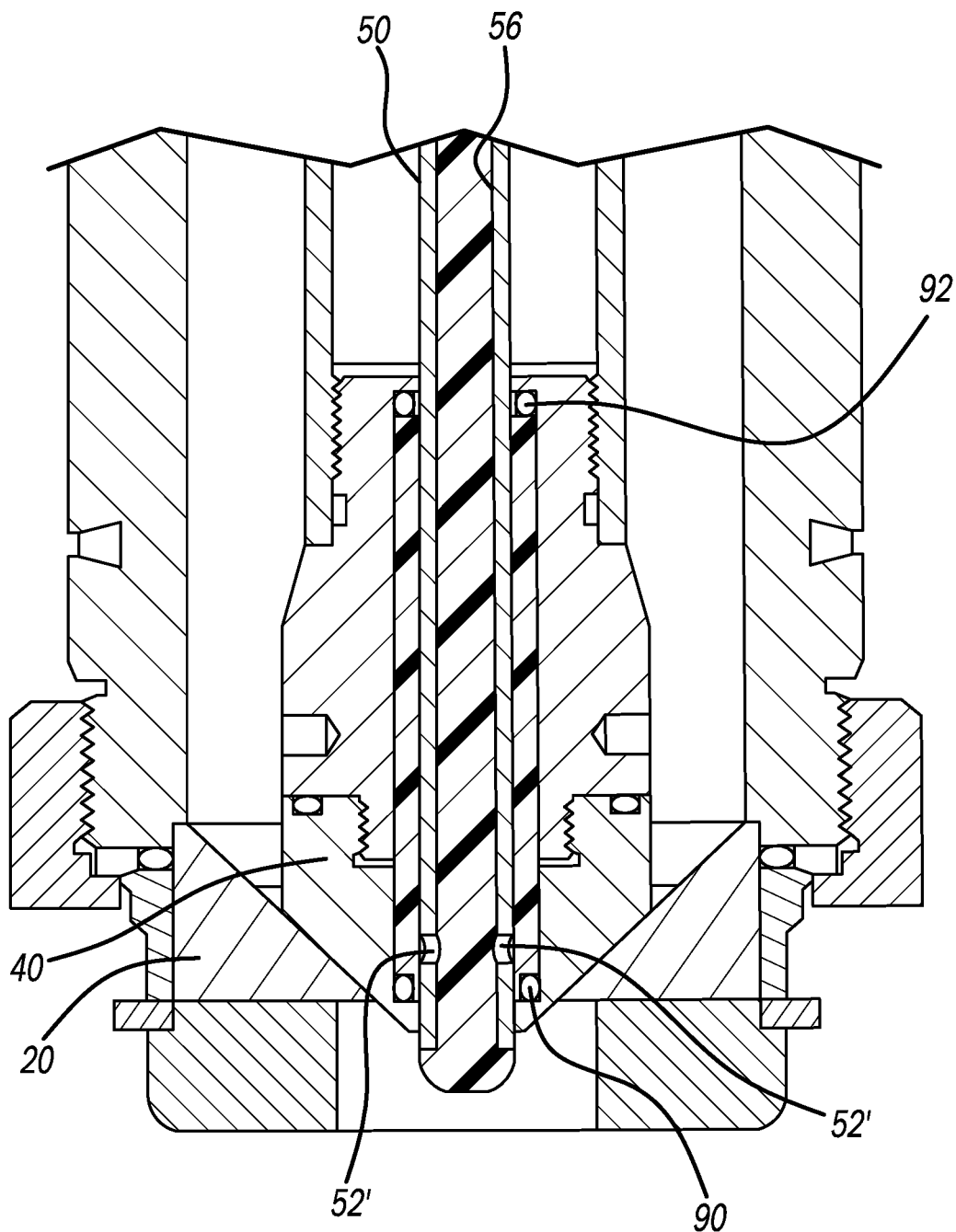
FIG. 4 illustrates the withdrawn stretch rod positioned such that an opening of the passageway is arranged between two seals positioned in a bore defined by the seal pin.

With initial reference to FIGS. 1 and 2, a system 10 is illustrated in accordance with the present disclosure for simultaneously forming and filling a container 12 from a preform 14. The preform 14 can be any suitable preform for forming a container of any suitable shape and size, such as the container 12 of FIG. 2. The preform 14 includes a finish 16, which is arranged against, or in cooperation with, a nozzle 20 in order to form a seal between the finish 16 and the nozzle 20. The nozzle 20 defines a nozzle passage 22. Fluid from any suitable fluid source 30 is introduced into the preform 14 through the nozzle passage 22. The fluid source 30 can include any fluid suitable to be introduced into the preform 14 to expand the preform 14 against a mold (not shown) to form the container 12. The fluid of the fluid source 30 may include the following: water, juice, any other type of beverage, and any other suitable commodities.

The system 10 further includes a seal pin 40. The seal pin 40 is movable to open and close the nozzle passage 22. The seal pin 40 can be moved in any suitable manner, such as with any suitable piston or other type of actuator. The seal pin 40 defines a bore 42 extending therethrough.

Slidably movable within the bore 42 is a stretch rod 50 of the system 10. The stretch rod 50 defines a first opening 52 and a second opening 54. A stretch rod passageway 56 extends from the first opening 52 to the second opening 54. The first opening 52 can be arranged in any suitable position along a length of the stretch rod 50 based on a location within the container 12 where air, fluid, and/or foam is likely to be removed. For example, if the air, fluid, and/or foam to be removed is anticipated to be proximate to the finish 16, the first opening 52 may be spaced apart from a distal end 58 of the stretch rod 50. Alternatively, the first opening may be arranged at reference numeral 52' proximate to the distal end 58. Locating the first opening at 52' advantageously allows the first opening 52' to be moved to any desired depth within the container 12 in order to specifically target particular areas of the container 12 from which fluid, air, and/or foam can be withdrawn from within the container 12. When the first opening is arranged at 52', the stretch rod passageway is extended at 56' in order to reach the first opening 52'.

With additional reference to FIG. 3A, the system 10 further includes a suction valve 70, a drain valve 72, and a vacuum source 76. The drain valve 72 is proximate to a drain 74. Each one of the suction valve 70, the drain valve 72, the drain 74, and the vacuum source 76 is in fluid communication with the stretch rod passageway 56, such as by way of any suitable conduits. The vacuum source 76 can be any suitable vacuum source, and can include a piston. The vacuum source 76 is generally arranged between the suction valve 70 and the drain valve 72.

The system 10 further includes any suitable control module 80. In this application, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The control module 80 is configured to move the seal pin 40 in order to open and close the nozzle passage 22. The control module 80 is further configured to control actuation of the stretch rod 50 in any suitable manner, such as through the operation of any suitable stretch rod piston. The control module 80 is further configured to operate the suction valve 70, the drain valve 72, and the vacuum source 76 in order to extract air, fluid, and/or foam out from within the container 12 as described herein.

With reference to FIG. 3B, the container 12 is formed from the preform 14 when the control module 80 moves the seal pin 40 to open the nozzle passageway 22, and operates any suitable pump in order to pump fluid from the fluid source 30 through the nozzle passage 22 and into the preform 14. The fluid expands the preform 14, which is heated, within a mold to form the container 12. As fluid is pumped into the preform 14, the control module 80 extends the stretch rod 50 in order to stretch the preform 14 into the container 12. The suction valve 70 and the drain valve 72 are closed as the container 12 is formed and filled with fluid from the fluid source 30.

Immediately after the container 12 is formed and filled with fluid from the fluid source 30, the control module 80 commands actuation of the seal pin 40 into the closed position of FIG. 3C. In the closed position, the seal pin 40 seals against the nozzle 20 in order to close the nozzle passage 22. Closing the nozzle passage 22 with the seal pin 40 traps the air previously within the preform 14 inside of the container 12 under formation pressure. Closing the seal pin 40 prevents air and fluid from flowing out of the container 12 back to the fluid source 30.

With continued reference to FIG. 3C, compressed air pressure is relieved out from within the container 12 by opening both the suction valve 70 and the drain valve 72. Specifically, air flows through the first opening 52 (or 52' illustrated in FIGS. 1, 2, and 4), into the stretch rod passageway 56, through the second opening 54, through the open suction valve 70, through the vacuum source 76, through the drain valve 72, and out through the drain 74.

With reference to FIG. 3D, excess fluid and/or foam is removed from within the container 12 by closing the drain valve 72, keeping the suction valve 70 open, and activating the vacuum source 76. The vacuum source 76 draws fluid and/or foam out of the container 12 through the stretch rod passageway 56, through the suction valve 70, and into a reservoir of the vacuum source 76. The stretch rod 50 can be actuated in order to position the first opening 52/52' at any suitable location within the container 12 from where fluid and/or foam is desired to be withdrawn from. Thus, providing the first opening at 52' advantageously allows fluid and/or foam to be withdrawn from any particular position between the finish 16 and a base of the container 12.

Withdrawing air, excess fluid, and/or foam out from within the container 12, as illustrated in FIGS. 3C and 3D for example, advantageously removes unwanted foam from within the container 12. A mixture of foam, air, and liquid is removed from within the container 12. From the drain 74, the foam, air, and liquid is returned to the main fill system.

After the desired amount of fluid and/or foam has been withdrawn from the container 12, the control module 80 separates the nozzle 20 from the finish 16, as illustrated in FIG. 3E. The nozzle 20 can be separated from the finish 16 by actuating a nozzle piston, or in any other suitable manner. The control module 80 then closes the suction valve 70, opens the drain valve 72, and actuates the vacuum source 76 to expel fluid out from within the reservoir of the vacuum source 76, and out through the drain 74.

With reference to FIG. 3F, the control module 80 then closes the drain valve 72, and retracts the stretch rod 50 out from within the container 12, thereby further dropping the fill point of the container 12. With reference to FIG. 4, if the first opening is at 52', the stretch rod 50 is retracted such that the first opening 52' is arranged within the bore 42 of the seal pin 40 between a primary seal 90 and a backup seal 92. Arranging the first opening 52' between the primary and backup seals 90 and 92 advantageously prevents excess fluid from leaking out of the first opening 52' and subsequently out from within the bore 42.

The present disclosure thus provides numerous advantages. For example, as fluid is introduced into the preform 14 in order to form and fill the container 12, air within the preform 14 is compressed from atmospheric pressure to 40 bars, reducing the displacement volume. This reduced air volume is replaced by liquid volume during filling. When the pressure is released by opening the suction valve 70 and the drain valve 72, the air volume returns to its atmospheric levels and displaces liquid. Because the air has been sheared and blended into the liquid during the fill, some air will also be displaced. Venting the displaced liquid/air through the passageway 56 of the stretch rod 50 advantageously removes much of the unwanted volume in order to provide fill level control. After venting, the vacuum source 76 (such as a cylinder thereof) pulls a mixture of liquid, air, and/or foam through the stretch rod 50 to provide the container 12 with a desired level of fluid. Liquid is removed from the container 12 to a desired level, or the vacuum source 76 is restricted to withdraw a specific amount of liquid. Collapse of the container 12 is advantageously prevented by creating an equalized atmospheric condition in a head space of the container 12 by either breaking the seal with the nozzle 20 or allowing the head space a connection to atmospheric pressure. The fill point is further lowered when the stretch rod 50 is removed from within the container 12. Thus, the stretch rod 50 serves as a volume control device.

Figure 5:
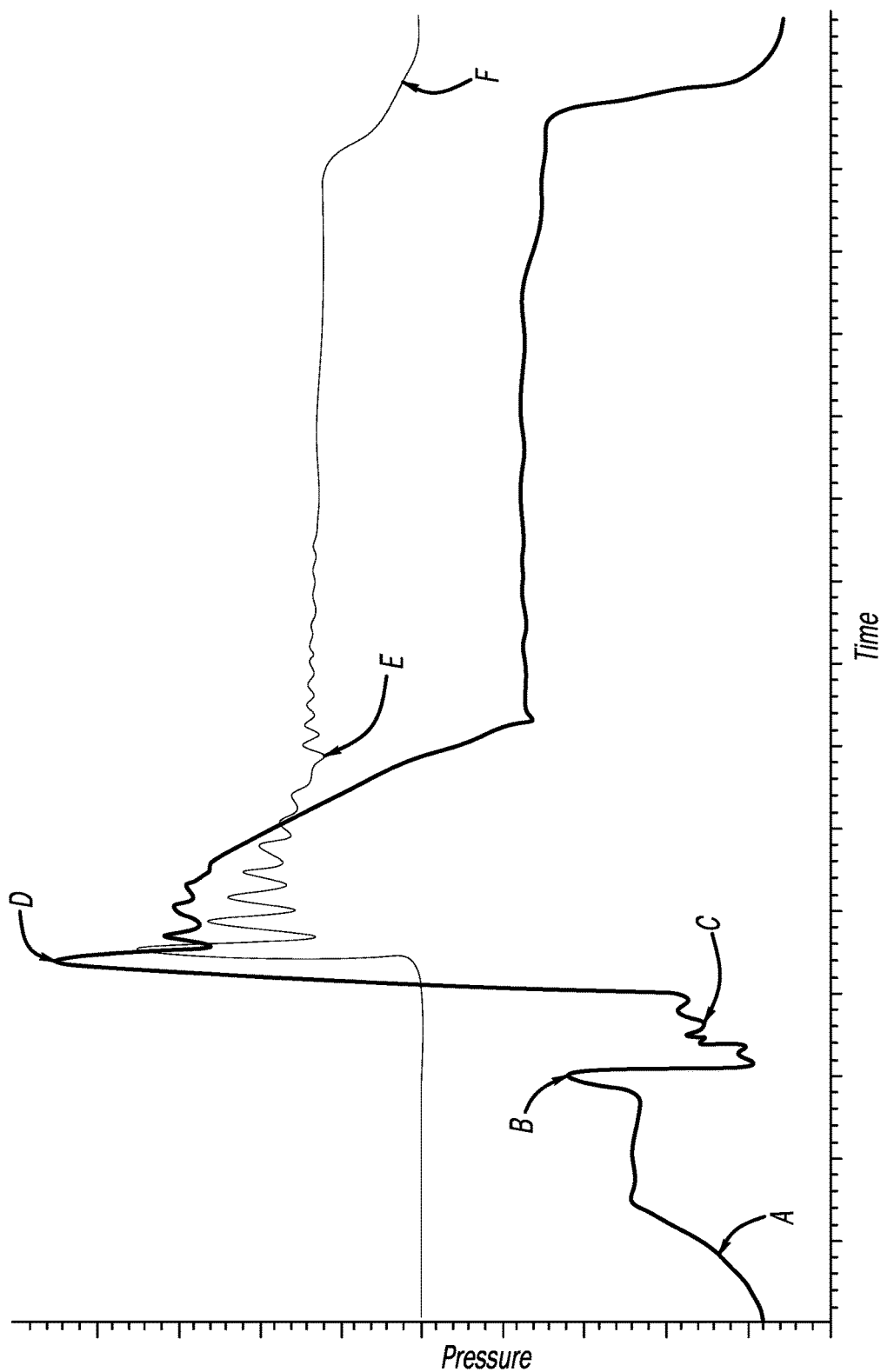
FIG. 5 illustrates control of liquid fill level and pressure during formation and filling of the container from the preform in accordance with the present disclosure.

FIG. 5 illustrates exemplary control of fill level and pressure when forming the container 12 from the preform 14 using the system 10 of the present disclosure. As explained above, the preform 14 can be any suitable shape and size to form the container 12 of any suitable shape and size. For example, the container 12 can be configured to hold 307 cc of liquid and 25 cc of air. Prior to fluid being introduced into the preform 14, fluid pressure builds in a fill head as generally illustrated at area A of the container forming curve of FIG. 5. Pressure in the fill head builds to area B, and then the fluid is introduced into the preform 14 at area C with about 25 cc of air in the preform 14. Pressure spikes to area D in the container 12 as the container 12 is nearly completely formed and filled, and the seal pin 40 closes. At area D, the pressure in the preform 14 due to the closed seal pin 40 compresses the air from about 25 cc to about 0.625 cc. Because the air is compressed, extra fluid is accommodated within the container 12, such as about 331.9 cc of total fluid. Subsequent to the pressure spike at area D, holding pressure in the now completely formed container 12 is reduced, which allows air within the container 12 to expand from about 0.6 cc to about 1.2 cc at 40 bar, and slightly reduces fluid within the container 12, such as to about 331.3 cc. At area F, pressure is vented through stretch rod 50, such as about 1.87 cc of air together with about 23 grams of fluid. This venting returns the pressure level to 25 cc of air and returns the fluid fill to about 307 cc.

The forming and filling system 10 of the present disclosure thus provides improved fill control. By closing the seal pin 40 as soon as the container 12 is formed and filled, the container 12 is advantageously closed off from the rest of the fill system. The pressure and fluid levels of the container 12 can be readily determined and controlled, such as by controlled venting through the stretch rod 50. When traditional venting is performed through the filling head, there is less fill level control. Closing the seal pin 40 as soon as the container is formed and filled to provide a closed system in accordance with the present disclosure also advantageously prevents air and fluid from flowing back through the nozzle 20 and back to the fill system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for simultaneously forming and filling a container from a preform with fluid, adjusting a fill point of the fluid, and removing air from within the container, the method comprising:
   injecting fluid from a fill source into the preform through a nozzle passage defined between the nozzle and a seal pin of the forming and filling system to simultaneously form the container from the preform and fill the container;
   prior to or during injection of fluid into the preform, extending a stretch rod into the preform such that a first opening defined by the stretch rod is within the preform and a second opening defined by the stretch rod is outside of the preform, a passageway defined by the stretch rod extends from the first opening to the second opening;
   after the container is formed and filled, actuating the seal pin to close the nozzle passage and prevent fluid and air from exiting the container through the nozzle passage, thereby trapping fluid and air within the container under pressure;
   extracting at least one of air, fluid, and foam out from within the container through the passageway defined within the stretch rod to adjust a fill point of the container; and
   after extracting air and fluid out from within the container, retracting the stretch rod out from within the container to position the second opening between two seals arranged within the nozzle.

2. The method of claim 1, further comprising, subsequent to extracting fluid out from within the container and prior to retracting the stretch rod out from within the container, separating the nozzle and the finish to define a gap therebetween.

3. The method of claim 2, wherein the vacuum source includes a piston.

4. The method of claim 1, further comprising extracting at least one of fluid and foam out from within the container with a vacuum source.

5. A method for simultaneously forming and filling a container from a preform with fluid, adjusting a fill point of the fluid, and removing air from within the container, the method comprising:
   positioning a finish of the preform at a nozzle of a forming and filling system;
   extending a stretch rod into the preform such that a first opening defined by the stretch rod is within the preform and a second opening defined by the stretch rod is outside of the preform, a passageway extends from the first opening to the second opening;
   injecting fluid from a fill source into the preform through a nozzle passage defined between the nozzle and a seal pin of the forming and filling system to simultaneously form the container from the preform and fill the container;
   stretching the preform with the stretch rod while injecting fluid into the preform to form the container;
   after the container is formed and filled, actuating the seal pin to close the nozzle passage and prevent fluid and air from exiting the container through the nozzle passage, thereby trapping fluid and air within the container under pressure;
   extracting air out from within the container through the passageway defined within the stretch rod;
   extracting at least one of fluid and foam out from within the container through the passageway defined within the stretch rod to adjust the fill point of the container and create a vacuum in the container; and
   retracting the stretch rod out from within the container.

6. The method of claim 5, further comprising opening a suction valve and a drain valve of the forming and filling system to release air out from within the container through the passageway defined within the stretch rod.

7. The method of claim 6, further comprising closing the drain valve, maintaining the suction valve open, and activating a vacuum source to extract at least one of fluid and foam out from within the container through the passageway defined within the stretch rod.

8. The method of claim 7, further comprising retracting the stretch rod such that the second opening is arranged between two seals of the nozzle to prevent any fluid within the passageway from leaking out of the passageway.

9. The method of claim 5, further comprising separating the nozzle and the finish to define a gap therebetween subsequent to extracting fluid out from within the container and prior to extracting the stretch rod out from within the container.

10. The method of claim 7, wherein activating a vacuum source includes actuating a fill level piston.

11. The method of claim 5, further comprising moving the stretch rod to position the first opening at a desired position within the container prior to extracting air out from within the container through the passageway defined within the stretch rod.

12. The method of claim 5, further comprising moving the stretch rod to position the first opening at a desired position within the container prior to extracting fluid or foam out from within the container through the passageway defined within the stretch rod to create a vacuum in the container.

13. A system for simultaneously forming and filling a container from a preform with fluid, adjusting a fill point of the fluid, and removing air from within the container, the system comprising:
   a nozzle that directs the fluid through an opening of a finish of the container connected to the nozzle;
   a seal pin movable to an open position from a closed position to open a nozzle passage of the nozzle to allow fluid to flow through the nozzle passage and through the opening of the finish to simultaneously form the container from the preform and fill the container;
   a stretch rod seated within, and movable through, a bore defined by the seal pin, the stretch rod defining a first opening, a second opening, and a passageway extending from the first opening to the second opening, the stretch rod is movable to stretch the preform into the container as fluid is injected through the opening of the finish;
   valves in fluid communication with the passageway defined by the stretch rod; and
   a control module configured to:
      move the seal pin to the open position to allow fluid to flow through the nozzle passage and through the opening of the finish to simultaneously form the container from the preform and fill the container; and move the seal pin from the open position to the closed position to close the nozzle passage after the container has been filled with fluid to prevent fluid, air, and foam from flowing out of the container and through the nozzle passage;

wherein after the nozzle passage is closed, the control module is configured to open the valves to release air pressure out of the container through the passageway defined by the stretch rod.

14. The system of claim 13, wherein the valves include a suction valve and a drain valve.

15. The system of claim 13, further comprising a vacuum source;

wherein after the nozzle passage is closed, the control module is configured to activate the vacuum source to draw at least one of fluid and foam out of the container through the passageway defined by the stretch rod.

16. The system of claim 15, wherein the vacuum source includes a piston.

17. The system of claim 13, where after the nozzle passage is closed and both air and fluid is drawn out of the container through the passageway of the stretch rod, the control module is configured to move the stretch rod out from within the container.

* * * * *